United States Patent [19]

Lundström

[11] 4,350,021

[45] Sep. 21, 1982

[54] DEVICE FOR PREVENTING ICING IN AN AIR CONDITIONING UNIT FOR MOTOR VEHICLES

[75] Inventor: Gustaf B. Lundström, Gothenburg, Sweden

[73] Assignee: AB Volvo, Gothenburg, Sweden

[21] Appl. No.: 204,080

[22] Filed: Nov. 4, 1980

[30] Foreign Application Priority Data

Nov. 12, 1979 [SE] Sweden .................................. 7909329

[51] Int. Cl.³ ............................................ F25D 21/00
[52] U.S. Cl. .......................................... 62/150; 62/80; 62/176 E
[58] Field of Search ....................... 62/150, 180, 176.6

[56] References Cited

U.S. PATENT DOCUMENTS 3,444,698  5/1969  Lorenz ............................ 62/150 X
3,464,224  9/1969  Swawson ............................... 62/80
3,465,534  9/1969  Sutton, Jr. ............................ 62/151

FOREIGN PATENT DOCUMENTS 2205407  of 0000  Fed. Rep. of Germany .
2438505  of 0000  Fed. Rep. of Germany .
1580833  of 0000  France .
2125381  of 0000  France .

Primary Examiner—William E. Wayner
Attorney, Agent, or Firm—Young & Thompson

[57] ABSTRACT

A device for preventing icing in a thermostat-controlled evaporator in an air conditioning unit for motor vehicles including a first sensor for sensing the speed of the air through the evaporator and preferably also a second sensor for sensing the humidity of the air. A control unit sets the thermostat to a lowest permissible evaporator temperature which is dependent on the speed and humidity of the air.

6 Claims, 1 Drawing Figure

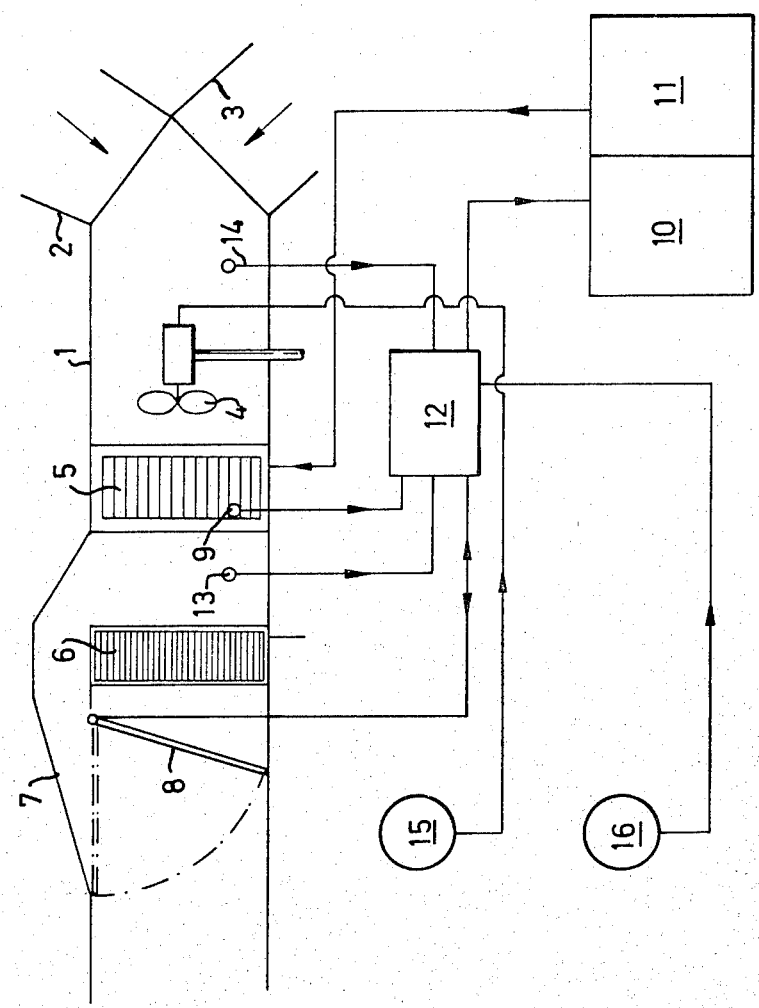

DEVICE FOR PREVENTING ICING IN AN AIR CONDITIONING UNIT FOR MOTOR VEHICLES

The present invention relates to a device for preventing icing in a thermostat-controlled evaporator in an air conditioning unit for motor vehicles.

It is important in air conditioning units to prevent icing of the evaporator in order that the airflow through the cooling flanges of the evaporator is not impeded. Therefore, the temperature in the evaporator must not be allowed to fall below a certain, predetermined level. This level varies, however, depending on the speed and humidity of the air flowing through the evaporator. High speed permits a lower temperature flow while high humidity displaces the permissible temperature upwards. The temperature of the evaporator is usually kept at a constant lowest level with the aid of an evaporator thermostat with a permanently set command valve or a permanently set suction pressure valve. The air conditioning unit must then be dimensioned on the basis of the worst conditions under which the unit is to operate; that being low air speed and high humidity. This results in the permissible evaporator temperature being relatively high (about 0° C.) and in the unit having a relatively low cooling capacity when the climate is dry and the air speed is high, e.g. when used in a desert climate with the fan at full speed.

In the past few years attempts have been made to remove the above-mentioned disadvantage by providing the air conditioning unit with a thermostat which can be adjusted with the aid of a manual control on the instrument panel of the vehicle. It has proved very difficult, however, in practice to achieve the correct setting without using "trial and error", easily resulting in icing. Since a vehicle must be able to be used by several different people, it is not a practical solution to install a control which requires lengthy experience in order to be properly used.

The purpose of the present invention is to achieve a device which removes the above-mentioned disadvantages by automatically varying the evaporator temperature, so that the cooling capacity of the air conditioning unit can receive maximum use.

This is achieved according to the invention by means of a device which in its simplest embodiment has a sensor for directly or indirectly sensing the speed of the air flowing through the evaporator, and a control means which is coordinated with the sensor and the thermostat to receive information on the air speed and send a control order dependent thereon to the thermostat to reduce the lower limit for the permissible evaporator temperature with increasing air speed, and vice versa.

In a further developed embodiment, the device is provided with a second sensor which is arranged to send the control means information on the humidity of the air stream through the evaporator, said control means being adapted to send a control order, dependent on both the air speed and the humidity, to the thermostat, so that the lowest limit for permissible evaporator temperature is lowered with increasing speed and/or dropping humidity, and vice versa.

With a device of this type, the cooling capacity can be increased by up to 40% over units having a thermostat which is permanently set for the worst conditions, i.e. low air speed and high humidity.

The invention will be described in more detail with reference to an embodiment shown in the accompanying drawing. The FIGURE shows a simplified block diagram of a climate control unit with components for both cooling and heating of the air.

In the FIGURE, 1 designates an air duct, the left-hand end of which opens into the vehicle. The right-hand end of the duct separates into two branches 2 and 3, one branch 2 being an inlet duct for fresh air and the other branch 3 being an inlet duct for recirculation of conditioned air. In duct 1 there is a fan 4, an evaporator 5 and a heating element 6. A shunt duct 7 with a controllable damper 8 conducts air past the heating element 6. The temperature of the air flowing into the vehicle is selected by cooled and heated air being mixed via a suitable setting of the damper 8.

The evaporator 5 is provided with a thermostat body 9 which senses the temperature of the coolant flowing through the evaporator.

A thermostat unit 10 cooperates with means 11 for regulating the evaporator temperature. These can comprise means for controlling the compressor drive shaft clutch or the suction pressure valve.

A control unit 12, which can comprise a microcomputer, is coupled between the thermostat body 9 and the thermostat unit 10. An air speed sensor 13 and a humidity sensor 14 are arranged in the air duct 1 and are connected to the control unit 12. Said control unit is programmed to compute, in response to the speed and humidity values obtained, the lowest temperature which can be permitted in the evaporator 5 without giving rise to icing, and to send control signals to the thermostat unit to set the computed lowest permissible temperature.

In the embodiment shown in the FIGURE, the air speed is regulated with a manually adjustable fan control 15 which is connected directly to the fan motor, the air speed being sensed directly by means of the sensor 13. In an alternative embodiment, which is not shown, the air speed can be measured indirectly by measuring the fan motor power by means of a measuring device which can be integrated in the control unit 12.

The temperature of the air flowing into the vehicle is selected by means of a manually adjustable temperature control 16 which is connected to the control unit 12, whereby the control unit regulates a setting motor for the shunt damper 8. When setting the control 16 for the lowest temperature, the control unit 12 sends a signal to the setting motor to completely close the damper 8, as shown in the FIGURE, so that there is no mixing-in of heated air into the cooled air. As an alternative to controlling of a shunt damper, the control unit 12 can control a valve which regulates the supply of heated water to the heating element 6. This type of regulation, however, is slower and more difficult to accurately adjust.

In the simplest case, the cooling unit always operates at maximum refrigerating capacity, with the temperature regulation being effected by mixing-in of a suitable amount of heated air. The evaporator temperature is then always at the lowest temperature which the control unit has computed on the basis of the values for the air speed and humidity.

In another embodiment within the scope of the invention, the thermostat unit 10 can be adjustable, so that the refrigerating effect of the unit can be reduced in relation to the maximum permissible refrigerating effect. The control unit 12 determines, as above, the lowest permissible evaporator temperature, but permits setting of the thermostat unit 10 at a higher temperature.

What I claim is:

1. A device for preventing icing in a thermostat-controlled evaporator in an air conditioning unit for motor vehicles, comprising a first sensor for sensing the speed of the air flowing through the evaporator, and control means which cooperates with the sensor and the thermostat to receive information on the air speed and to send a control order dependent thereon to the thermostat to reduce the lower limit for permissible evaporator temperatur with increasing air speed, and vice versa.

2. A device according to claim 1, in which the first sensor is a sensor body placed in the air stream for direct sensing of the air speed.

3. A device according to claim 1, in which the first sensor is a measuring device for indirect sensing of the air speed by measuring the consumption of electricity by an electric motor, which drives a fan producing the air stream.

4. A device according to any one of claims 1 to 3, and a second sensor which is arranged to send to the control means information on the humidity of the air stream through the evaporator, the control means being disposed to send a control order dependent on both the air speed and humidity to the thermostat, so that the lower limit for permissible evaporator temperature is reduced with dropping humidity, and vice versa.

5. A device according to any one of claims 1-3, in which the control means comprises a microcomputer.

6. A device according to claim 4 in which the control means comprises a microcomputer.

* * * * *